June 28, 1927.
S. OTIS
1,633,603
AUTOMOBILE BUMPER
Filed Oct. 19, 1925
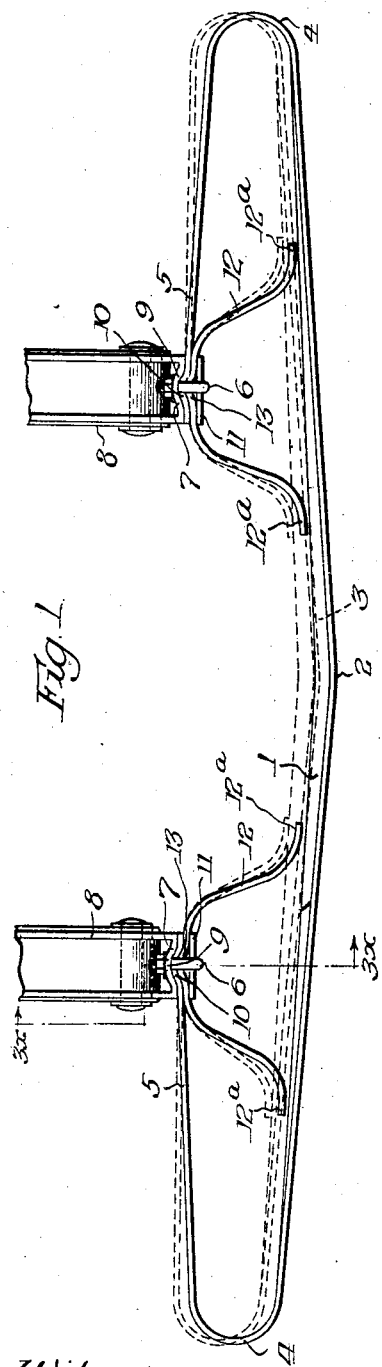
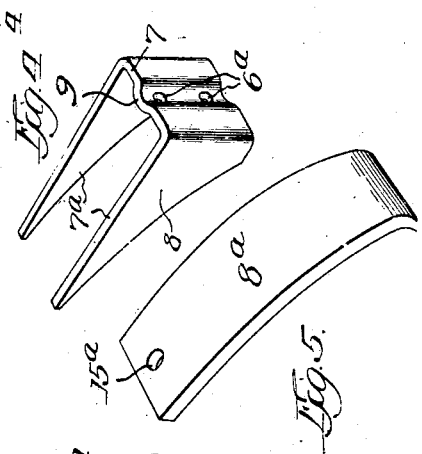
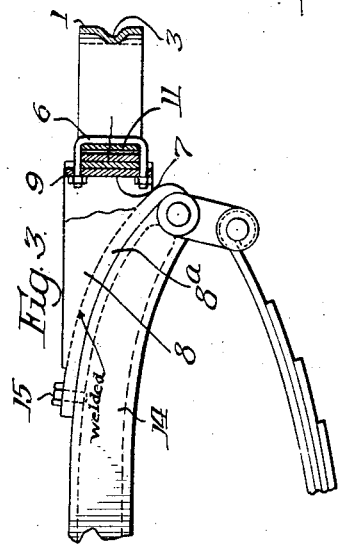
Inventor:
Spencer Otis, Patented June 28, 1927.

1,633,603

UNITED STATES PATENT OFFICE.

SPENCER OTIS, OF BARRINGTON, ILLINOIS, ASSIGNOR TO THE LOCOMOTIVE TERMINAL IMPROVEMENT COMPANY, OF CHICAGO, ILLINOIS, A CORPORATION OF MAINE.

AUTOMOBILE BUMPER.

Application filed October 19, 1925. Serial No. 63,212.

This invention relates to bumpers to be placed upon road vehicles in positions to receive and render harmless the impact due to minor collisions; and the invention has for its object to provide a bumper which will be very efficient in serving its intended purpose, of relatively light construction, and simple and cheap in its production and assembly as well as its application to the vehicle upon which it is to be used.

One object of the invention is to provide a vehicle bumper in which all, or approximately all, of the outer portion is comprised in a relatively rigid impact bar continuous across the end of the vehicle, and having its ends resiliently supported by portions which are thin in horizontal transverse dimension to afford high resiliency, but wide in vertical transverse dimension to resist drooping, and which are bent upon themselves to increase the area of resiliency and reach the points of attachment, for instance, the ends of the chassis frame; and, to this end, one feature of the invention consists in forming the main body of the bumper and its return bend supporting ends, out of a single piece of rolled steel band, preferably of uniform dimension throughout, the forwardly presented or body portion being slightly cambered at its medial point, and being pressed with a longitudinal panel tapering from the middle toward the ends for the purpose of lending stiffness in the direction of impact; and the extremities of the return bend supporting portions being constructed for attachment to the vehicle, for instance, through the medium of clip bolts, so that impact against the bumper anywhere, except at its extreme outer ends, will be transmitted in part to each support, without bending of the body portion.

Another object is to provide means normally out of function but adapted to enter into function as a reinforce to the body of the bumper to assist in absorbing relatively heavy impact; and, to this end, another feature of the invention consists in mounting upon the bumper attaching means, a curved resilient reinforcing yoke having resilient free ends presented in positions normally out of contact with the body of the bumper, and therefore leaving the bumper with a high state of resiliency under minor impacts, but adapted to receive and absorb shock of impacts sufficiently large to move the body of the bumper rearwardly into contact with the reinforcing yokes.

Still another object is to provide an improved means for attaching a bumper to a vehicle; and, to this end, a further feature of the invention resides in an attaching bracket comprising a base plate conforming to and adapted to be secured upon the forward end of the chassis frame, and a U-shaped bracket integrally united thereto, for instance, by welding, and having a vertical front wall receiving a U-bolt or clip which embraces the end of the resilient supporting leg of the bumper as well as the reinforcing yoke or spring; said front wall, as well as parts to be bolted thereto, being provided with vertical crimps to resist relative displacement between the united parts; and a flat resilient clamping plate being introduced between the U-bolt and the parts which it clamps, in order to maintain sufficient resiliency in the clamping to resist loosening of the nuts by vibration.

In order that the invention may be fully understood, the preferred embodiment will be described in connection with the accompanying drawing, in which—

Figure 1 is a plan view of the complete bumper with portions of its attaching brackets.

Figure 2 is a front view of the bumper.

Figure 3 is a detail view showing the attaching bracket and parts clamped thereto, partly in section; and Figures 4 and 5 are perspective views, respectively, of the U-shaped bracket and its base plate from which the complete attaching bracket is made.

1 represents the front bar of the bumper which is provided with a slight camber at 2, and has pressed into it a panel 3 tapering in both depth and width from its middle point 2 toward the ends, and having the effect of imparting substantial rigidity to the body of the bumper and cause it to act more nearly as a unit rather than as a member resilient at immediate points of contact. The body member 1 merges into integral return bends 4 and continues therefrom in inwardly extending attaching ends 5 which constitute the supports for the bumper and which are connected with the vehicle through means of U-shaped clip bolts 6 embracing the ends 5 and passing through the front transverse walls 7 of attaching brackets 8. In order that the attaching ends 5 may be prevented from displacement, longitudinally of the supporting ends or transversely of the vehicle, both the front walls 7 of the brackets and the overlying portions of the supporting ends are provided with crimps 9 and 10; but preferably the U-shaped clip bolt 6 does not enter into the recess formed by a crimp but clamps the part which it embraces through means of a plate 11 having sufficient inherent resiliency to take up vibration and avoid loosening the nuts on the U-bolts.

In order to reinforce the body member 1 when large impacts are encountered without destroying the high resiliency which the bumper should have under small impact, a reinforcing spring or yoke 12 is mounted on either side of the middle 2 of the bumper, and the ends 12ª of these reinforcing members are fashioned to enter into bearing with the rear surface of the body member 1, but are preferably out of contact therewith normally for the purpose, as stated, of leaving a relatively high initial or normal resiliency in the mounting of the bumper. The crests of the curved springs or yokes 12 are provided with crimps 13 conformably to the crimps 9 and 10 in order to resist displacement of the springs or yokes, and it is upon these members that the spring plate 11 rests in order that both the supporting ends of the bumper and the reinforcing springs or yokes may be held by the same clips.

As a preferred means for mounting a bumper of the kind described upon a vehicle, the bracket 8 consists of a base plate 8ª conforming to the upper curved surface of the side bars 14 of the chassis frame and suitably secured thereon, for instance, by means of tap screws 15 passing through the perforation 15ª and entering the chassis frame; also a U-shaped bracket member integrally mounted upon said base plate preferably by electrically welding it thereto, and consisting of the aforesaid vertical front wall 7 and cheeks 7ª. Vertical wall 7, which receives the U-shaped clip bolt, is provided with perforations 6ª to receive the ends of said bolt and afford proper bearing for its securing nuts.

With a bumper constructed as described, impact against the front or body member 1 will tend to displace the latter bodily rearward, as suggested by the dotted lines in Figure 1, the return bends 4 and attaching ends 5, which are of relatively high resiliency, readily absorbing light impacts without injury either to the vehicle or object of impact, and both return bends and attaching ends contributing to the absorption of the impact because of the rigid nature of the front bar or body member. But in case of an excessive impact sufficient to take up the space between the ends 12ª of the reinforcing yokes or springs and the front member 1 of the bumper, said yokes or springs will lend further resistance of a resilient nature to the displacement of the front bar and save the attaching ends and reverse bends from flexure beyond their elastic limit.

A bumper constructed as described can be produced with peculiar advantage from rolled steel stock of uniform section, for instance, so-called band steel, and at relatively small expense; the design is such that the structure can be conveniently mounted on a vehicle; and the described means of mounting it is peculiarly adapted for receiving a bumper of this particular construction.

I claim:

1. A bumper, comprising a front bar, supporting members extending inwardly from the ends of said front bar, and spring yokes connected with said supporting members at intermediate portions of the yokes; said yokes having forwardly extending and diverging arms in position to receive the front bar when the latter is displaced rearwardly, but normally out of contact with said front bar.

2. A bumper, comprising a front bar, a pair of resilient supporting members extending inwardly from the ends of said front bar, a pair of attaching means through which said supporting members are connected with a vehicle, and a pair of spring-reinforcing yokes each connected at its intermediate point with said supporting members, and each comprising a pair of forwardly extending and diverging arms having their ends presented in sustaining relation to the front bar and collectively affording four distributed points of sustention for said front bar in addition to the sustention which it receives at its ends from the supporting member.

3. In a vehicle bumper, a body member constructed with return bends and inwardly extending supporting arms, and mounting brackets receiving the extremities of said supporting arms; each mounting bracket comprising an attaching base and a U-shaped bracket member having a substantially vertical front wall to which said supporting ends are secured.

4. In a vehicle bumper, an attaching bracket comprising a base plate, a U-shaped bracket member having a substantially vertical front wall, and a clip bolt adapted to secure the bumper member to said front wall; said front wall having a vertical crimp.

5. In combination, a vehicle bumper consisting of a front bar, a return bend and a supporting arm, and a mounting bracket comprising a U-shaped member having a substantially vertical front wall and a U-shaped clip bolt embracing the extremities of the supporting arm and extending through said front wall; said front wall and extremities being fluted vertically to resist relative displacement between the arm and the wall.

Signed at Chicago, Illinois, this 10 day of October, 1925.

SPENCER OTIS.